(12) United States Patent
Yasuda

(10) Patent No.: US 12,181,049 B2
(45) Date of Patent: Dec. 31, 2024

(54) GASKET

(71) Applicant: ISHIKAWA GASKET CO., LTD., Tokyo (JP)

(72) Inventor: Kisho Yasuda, Tokyo (JP)

(73) Assignee: ISHIKAWA GASKET CO., LTD., Tokyo (JP)

( * ) Notice: Subject to any disclaimer, the term of this patent is extended or adjusted under 35 U.S.C. 154(b) by 0 days.

(21) Appl. No.: 18/169,378

(22) Filed: Feb. 15, 2023

(65) Prior Publication Data

US 2023/0258265 A1   Aug. 17, 2023

(30) Foreign Application Priority Data

Feb. 15, 2022   (JP) .................................. 2022-021197

(51) Int. Cl.
| | |
|---|---|
| *F16J 15/08* | (2006.01) |
| *B05D 7/00* | (2006.01) |
| *B05D 7/14* | (2006.01) |

(52) U.S. Cl.
CPC ............ F16J 15/0806 (2013.01); B05D 7/14 (2013.01); B05D 7/56 (2013.01); *B05D 2530/00* (2013.01)

(58) Field of Classification Search
CPC .. F16J 15/0806; F16J 15/0818; F16J 15/0825; B05D 7/14
See application file for complete search history.

(56) References Cited

U.S. PATENT DOCUMENTS

| | | | | |
|---|---|---|---|---|
| 4,648,607 A | * | 3/1987 | Yamada | F16J 15/0831 |
| | | | | 277/598 |
| 5,110,630 A | * | 5/1992 | Abe | B05D 7/546 |
| | | | | 148/264 |
| 5,141,237 A | * | 8/1992 | Yamada | F16J 15/0831 |
| | | | | 277/598 |

(Continued)

FOREIGN PATENT DOCUMENTS

| | | |
|---|---|---|
| JP | 63-045456 U | 3/1988 |
| JP | 5-1066 U | 1/1993 |

(Continued)

OTHER PUBLICATIONS

Japanese Office Action dated Nov. 1, 2022, Japanese Patent Application No. 2022-021197, English translation included, 4 pages.

(Continued)

*Primary Examiner* — Eugene G Byrd
*Assistant Examiner* — L. Susmitha Koneru
(74) *Attorney, Agent, or Firm* — Rankin, Hill & Clark LLP

(57) ABSTRACT

A gasket includes: a metal plate portion having a sealing target hole and a fastening hole; and a coating layer applied to a surface of the metal plate portion. The coating layer includes a rubber layer and a lubricating layer having a lower coefficient of friction than the surface of the metal plate portion. In the coating layer on a part of the surface of the metal plate portion that includes at least a periphery of the sealing target hole, the rubber layer and the lubricating layer are laminated and the lubricating layer is arranged on a surface layer of the coating layer. In the coating layer on a periphery of the fastening hole, the rubber layer is laminated and the rubber layer is arranged on a surface layer of the coating layer.

6 Claims, 1 Drawing Sheet

(56) References Cited

U.S. PATENT DOCUMENTS

| | | | |
|---|---|---|---|
| 5,150,910 A | 9/1992 | Udagawa | |
| 5,731,040 A * | 3/1998 | Akita | B05D 7/14 427/428.21 |
| 5,806,857 A * | 9/1998 | Mockenhaupt | F16J 15/0831 277/650 |
| 6,409,178 B1 * | 6/2002 | Raden | F16J 15/0825 277/592 |
| 7,914,008 B2 * | 3/2011 | Imai | F16J 15/0831 277/313 |
| 9,120,124 B2 * | 9/2015 | Takahashi | F16J 15/122 |
| 2007/0054095 A1 * | 3/2007 | Kasuya | F16J 15/122 428/172 |
| 2008/0164661 A1 * | 7/2008 | Imai | F16J 15/0831 277/598 |
| 2012/0225299 A1 * | 9/2012 | Takahashi | F16J 15/121 427/370 |
| 2020/0032904 A1 | 1/2020 | Tanji et al. | |

FOREIGN PATENT DOCUMENTS

| | | |
|---|---|---|
| JP | H08-145179 A | 6/1996 |
| JP | 2000-081140 A | 3/2000 |
| JP | 2004-068886 A | 3/2004 |
| JP | 2005-114027 A | 4/2005 |
| JP | 2012-219183 A | 11/2012 |
| WO | 2018/163642 A1 | 9/2018 |

OTHER PUBLICATIONS

Korean Office Action dated Oct. 21, 2024 from corresponding Korean Application No. 10-2023-0019723, with English translation, 13 pages.

* cited by examiner

GASKET

CROSS-REFERENCE TO RELATED APPLICATIONS

This application is based on and claims priority under 35 USC 119 from Japanese Patent Application No. 2022-021197 filed on Feb. 15, 2022, the contents of which are incorporated herein by reference.

TECHNICAL FIELD

The present disclosure relates to a gasket, and more particularly to a gasket having a micro-sealing coating layer on a metal plate.

BACKGROUND ART

Various gaskets having a coating layer on a surface of a metal plate have been proposed (see JP2000-081140A, JP2004-068886A, and JP2012-219183A). A coating layer proposed in JP2000-81140A has a one-layer structure of a rubber coating layer containing inorganic lubricant powder that does not dissolve in solvent of a rubber paint, and is provided over a periphery of a combustion chamber hole or an entire surface of a metal plate. A coating layer proposed in JP2004-068886A has a one-layer structure of a rubber compound paint obtained by adding an inorganic lubricant powder and a silane coupling agent to a paint made of fluororubber as a raw material, and is provided on and near a board that surrounds and seals a fluid hole such as a cylinder bore. A coating layer proposed in JP2012-219183A has a two-layer structure in which an elastomer coated on a metal plate and a paint composition containing an anionic polyester-based urethane resin, a fixed lubricant, and a solvent are laminated, and an installation position of the coating layer is not particularly limited. As described above, all of the coating layers proposed in JP2000-081140A, JP2004-068886A, and JP2012-219183A are a set of a rubber layer and a lubricating layer in order to secure slidability of the gasket, which is hindered by the rubber layer alone.

Engine and exhaust gaskets have sealing target holes (for example, cylinder bores, water and oil holes, and exhaust channel holes) as well as fastening holes into which fasteners such as bolts are inserted. When a coating layer consisting of a set of a rubber layer and a lubricating layer proposed in JP2000-081140A, JP2004-068886A, or JP2012-219183A is also applied to a periphery of the fastening hole, smooth sliding in the periphery of the fastening hole may cause a position of the fastening hole to shift. In addition, due to deterioration over time, components of the lubricating layer may enter the fastening hole, causing loosening of the fastener. On the other hand, when a coating layer is not applied to the periphery of the fastening hole, a sealing property is degraded due to effects of a scratch, surface roughness, distortion, or the like on the surface of the metal plate. In this way, even when the coating layer proposed in JP2000-081140A, JP2004-068886A, or JP2012-219183A is applied to a gasket that has a plurality of holes with different features, it is not possible to achieve both micro-sealing property and slidability, and thus further improvement becomes necessary.

SUMMARY OF INVENTION

An object of the present disclosure is to provide a gasket that ensures micro-sealing property and slidability even when holes with different features are formed.

According to one aspect of the present disclosure, there is provided a gasket including: a metal plate portion having a sealing target hole and a fastening hole; and a coating layer applied to a surface of the metal plate portion. The coating layer includes a rubber layer and a lubricating layer having a lower coefficient of friction than the surface of the metal plate portion. In the coating layer on a part of the surface of the metal plate portion that includes at least a periphery of the sealing target hole, the rubber layer and the lubricating layer are laminated and the lubricating layer is arranged on a surface layer of the coating layer. In the coating layer on a periphery of the fastening hole, the rubber layer is laminated and the rubber layer is arranged on a surface layer of the coating layer.

According to the present disclosure, the feature of the coating layer can be varied depending on the part by multilayering the coating layer for each feature. In other words, the rubber layer is arranged at the part where the micro-sealing property is required, and the lubricating layer is laminated on the rubber layer at the part where the slidability is required in addition to the micro-sealing property. Therefore, even when a sealing target hole and a fastening hole having different features are formed in the metal plate, micro-sealing property and slidability can be secured.

DESCRIPTION OF EMBODIMENTS

Figure 1:
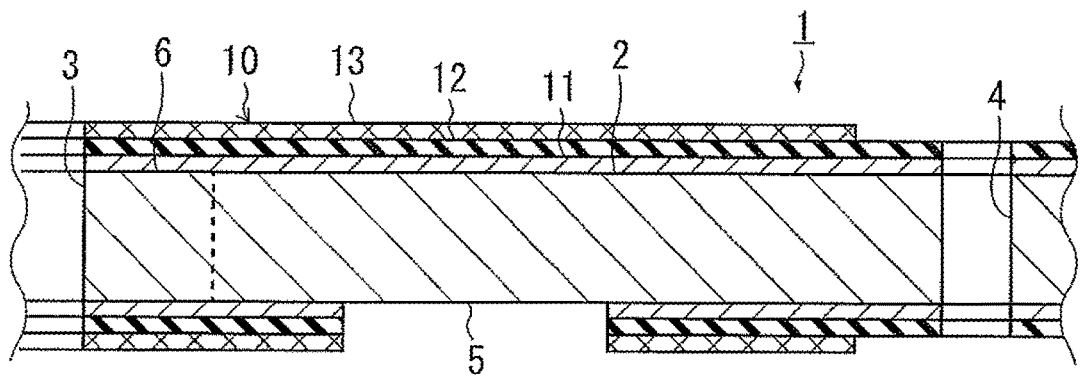
FIG. 1 is an explanatory diagram illustrating an embodiment of a gasket.
Figure 2:
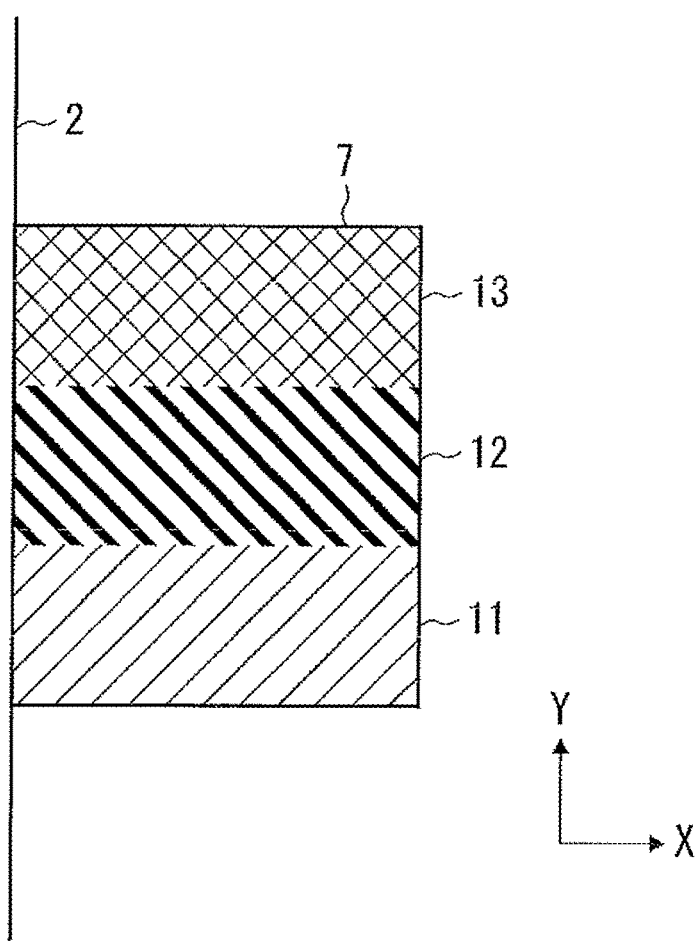
FIG. 2 is an explanatory diagram illustrating a tag portion of the gasket.

A gasket of the present disclosure will be described below based on an embodiment illustrated in the drawings. In FIGS. 1 and 2, dimensions are changed so that a structure can be easily understood, and the dimensions do not necessarily correspond to proportions of a product actually manufactured.

A gasket 1 illustrated in FIG. 1 is a cylinder head gasket for an engine that is interposed between a cylinder block and a cylinder head of a known engine. The gasket 1 has a metal plate portion 2 formed with a sealing target hole 3, a fastening hole 4, and a lid portion 5. The number of sealing target holes 3, fastening holes 4, and lid portions 5 formed in the metal plate portion 2 is not particularly limited, and a large number of sealing target holes, fastening holes, and lid portions may be formed according to the application.

The metal plate portion 2 is formed of a single metal plate or a laminated plate in which a plurality of metal plates are laminated in a Z direction. Known metals and alloys such as stainless steel, copper, and aluminum can be used as the metals and alloys forming the metal plate. When the metal plate portion 2 is formed of a laminated plate, each metal plate may include different metals or alloys. Although the number of laminated layers of the laminated plate is not particularly limited, it is preferably three layers or more and six layers or less.

The sealing target hole 3 is a hole through which a gas such as gas or a liquid such as water and oil flows among the holes penetrating through the metal plate portion 2 in the Z direction. Examples of the sealing target hole 3 include a cylinder bore, a water and oil hole, and an exhaust gas flow passage hole. A seal portion 6 is formed on a periphery of the sealing target hole 3. A known sealing structure can be used for the seal portion 6. Examples of the sealing structure include beads and folds formed by bending the metal plate of the metal plate portion 2, and grommets and rubber rings attached to end portions of the metal plate.

The fastening hole 4 is a hole into which a fastener such as a bolt is inserted, out of the holes penetrating the metal plate portion 2 in the Z direction. A seal portion may be formed on a periphery of the fastening hole 4 in the same manner as the sealing target hole 3, but it is not necessary to form a seal portion when the fastening hole 4 is not required to be sealed.

The lid portion 5 is a part that closes a flow path of liquid such as water and oil, and is partitioned on a lower surface of the metal plate portion 2. The lid portion 5 is always exposed to those liquids. An example of the lid portion 5 is a portion that covers a water jacket formed outside a cylinder bore of a cylinder block in a gasket incorporated in an engine having an open deck structure. The lid portion 5 is not limited to a portion always exposed to fluid (fluid flowing in a predetermined direction) in motion, but may include a portion always exposed to stationary fluid. Further, the lid portion 5 is not limited to be partitioned on the lower surface of the metal plate portion 2, and may be partitioned on a upper surface. The lid portion 5 partitioned on the upper surface features as a bottom of a fluid flow path and the like.

The coating layer 10 is applied to at least both the upper and lower surfaces of the metal plate portion 2 in the Z direction. The coating layer 10 may be applied to all of the upper and lower surfaces of each metal plate when the gasket 1 is formed of a laminated plate. The coating layer 10 may also be applied to the lid portion 5, but there is a risk that the coating layer will peel off when applied to the lid portion 5 which is constantly exposed to fluid. Therefore, it may be desirable that the coating layer 10 is omitted from the lid portion 5 and applied to the upper and lower surfaces of the metal plate portion 2 excluding the lid portion 5. By applying the coating layer 10 to the surface of the metal plate portion 2, the effects of scratches, surface roughness, distortion, and the like on a surface of the metal plate can be eliminated, and a sealing property of the gasket 1 can be improved. The improvement in sealing property of the gasket 1 by the coating layer 10 is a micro-sealing property. Although the micro-sealing property varies depending on the type of layer that forms the coating layer 10, even when the types of constituent layers are different, it is possible to ensure the micro-sealing property compared to a surface of the metal plate not coated with the coating layer 10.

The coating layer 10 has an adhesion layer 11, a rubber layer 12, and a lubricating layer 13. Each layer of the coating layer 10 has a feature other than the micro-sealing property, and different layers are laminated depending on the part of the gasket 1.

The adhesion layer 11 is interposed between the surface of the metal plate portion 2 and the rubber layer 12. The adhesion layer 11 has a feature of adhering the rubber layer 12 to the surface of the metal plate portion 2. The adhesion layer 11 only needs to be more adhesive than the surface of the metal plate portion 2 and the rubber layer 12, and a known binder such as a water-based binder, an organic solvent-based binder, or an inorganic binder can be used. The adhesion layer 11 may optionally be made by mixing a known binder with the same material as the rubber layer 12 described below, but it may be desirable that the adhesion layer 11 has only the feature of adhering the rubber layer 12 to the surface of the metal plate portion 2. The adhesion layer 11 of the present embodiment is made of, for example, epoxy resin.

The rubber layer 12 has a lower thermal conductivity than the metal plate in addition to a feature of enhancing the adhesion of the metal plate portion 2. Also, the rubber layer 12 is superior in heat resistance to the adhesion layer 11 and its heat resistance temperature is higher than that of the adhesion layer 11. The heat resistance temperature is a temperature at which softening, deterioration of mechanical properties, deformation, adhesion to the surroundings, and the like occur, and is also called a use limit temperature or a maximum use temperature. The rubber layer 12 may have a lower thermal conductivity than the metal plate and a higher heat resistance than the adhesion layer 11, and known rubber having high heat resistance can be used. Synthetic rubbers such as fluororubbers and silicone rubbers are exemplified as rubbers having high heat resistance. The rubber layer 12 of the present embodiment is made of, for example, fluororubber.

Although the adhesion layer 11 and the rubber layer 12 are separate layers in the present embodiment, the adhesion layer 11 may not be essential in a case the rubber layer 12 is sufficiently adhered to the surface of the metal plate portion 2. Also, instead of the adhesion layer 11 and the rubber layer 12, an adhesion rubber layer in which the same binder as the binder forming the adhesion layer 11 is mixed in the rubber layer 12 may be used. However, with the adhesion rubber layer, a ratio of each of the rubber component and the binder component per unit volume becomes low, and thus the features of the rubber and the binder are lowered as compared with the structure in which the adhesion layer 11 and the rubber layer 12 are separate layers. Therefore, it may be desirable that the adhesion layer 11 and the rubber layer 12 are independent layers.

The lubricating layer 13 has better lubricity than the surface of the metal plate portion 2 and has a lower coefficient of friction than the surface of the metal plate. The lubricating layer 13 may have lubricity superior to that of the surface of the metal plate portion 2, and a known solid lubricant may be used. Examples of solid lubricants include fluororesin, molybdenum disulfide, and graphite. The lubricating layer 13 may be formed of solid lubricant alone, but may also use a binder as a binder to enhance adhesion with an underlying layer. The lubricating layer 13 of the present embodiment is made of fluororesin using epoxy resin as a binder.

At a part including the seal portion 6 which is the periphery of the sealing target hole 3, the coating layer 10 includes three layers including the adhesion layer 11, the rubber layer 12, and the lubricating layer 13. In detail, in the portion including the seal portion 6, the adhesion layer 11, the rubber layer 12, and the lubricating layer 13 are laminated in order from the surface of the metal plate portion 2, and the lubricating layer 13 is arranged on a surface layer of the coating layer 10. The portion including the seal portion 6 may be a portion including only the seal portion 6, but in order to improve the sealing property of the gasket 1, it may be desirable to use a portion excluding a periphery of the fastening hole 4 and the lid portion 5.

By applying a three-layered coating layer 10 to the part including the seal portion 6, the coating layer 10 exhibits generally three features in addition to the feature of the micro-sealing property. A first feature is to prevent peeling of the coating layer 10 by improving the adhesiveness by the adhesion layer 11. A second feature is to prevent thermal damage to the adhesion layer 11 by improving the heat resistance by the rubber layer 12. In addition to this feature, it also has a feature of preventing thermal damage to the metal plate portion 2 by suppressing heat transfer to the metal plate portion 2. A third feature is to reduce the friction on the surface of the gasket 1 by improving the slidability by the lubricating layer 13 so that it slides smoothly.

The coating layer 10 includes two layers including the adhesion layer 11 and the rubber layer 12, at the periphery of the fastening hole 4. More specifically, in the periphery of the fastening hole 4, the adhesion layer 11 and the rubber layer 12 are laminated in order from the surface of the metal plate portion 2, and the rubber layer 12 is arranged on the surface layer of the coating layer 10.

A two-layered coating layer 10 is applied to the periphery of the fastening hole 4, so the lubricating layer 13 that exists in the three-layered coating layer 10 does not exist. Therefore, it is possible to prevent misalignment of the fastening holes 4 due to the lubricating layer 13 and loosening of a fastener due to the lubricating layer 13. In addition, at the periphery of the fastening hole 4, in addition to the feature of micro-sealing property, a feature to prevent, for example, peeling of the coating layer 10 by improving adhesion by the adhesion layer 11 and a feature of preventing thermal damage to the adhesion layer 11 by improving the heat resistance by the rubber layer 12 are exhibited.

Next, a method for manufacturing the gasket 1 will be described. The gasket 1 is formed with the sealing target hole 3, the fastening hole 4, and the seal portion 6 after the coating layer 10 is applied to the metal plate forming the metal plate portion 2. The coating layer 10 is formed by repeating the application and drying of a different coating for each layer. More specifically, an adhesion layer paint containing an epoxy resin as a component is applied to a metal plate having surfaces that serve as upper and lower surfaces of the metal plate portion 2, except for the lid portion 5, and dried to form the adhesion layer 11. Next, on the adhesion layer 11, a rubber layer paint containing fluororubber as a component is applied and dried to form the rubber layer 12. Next, a lubricating layer paint containing an epoxy resin and a fluororesin as components is applied on the rubber layer 12 except for the periphery of the fastening hole 4, and dried to form the lubricating layer 13.

A tag portion 7 illustrated in FIG. 2 protrudes outward from an outer periphery of the metal plate portion 2 in plan view. The tag portion 7 is a member that is not interposed between upper and lower two members when the gasket 1 is interposed and fastened between the upper and lower two members. It may be desirable that the tag portion 7 protrudes outward further than the outer peripheries of the upper and lower two members. Each coating layer 10 is exposed on the surface of the tag portion 7. Specifically, the adhesion layer 11, the rubber layer 12, and the lubricating layer 13 are exposed on the surface of the tag portion 7 in order from one end to the other end in a Y direction. Each layer is applied to the tag portion 7 when the coating layer 10 is formed. By providing such a tag portion 7 and coating the tag portion 7 when coating each layer, it is possible to easily check a laminated state of the coating layer 10. This is advantageous in preventing mistakes such as omission of coating during a manufacturing process.

In addition, it may be desirable that the object colors of all layers including the metal plate portion 2 and each layer of the coating layer 10 are different from each other so that management by color is possible. When there is no difference in any object color in all layers, paints can be mixed to create different hues, saturations, and lightnesses. In this way, all the layers including the metal plate portion 2 and each layer of the coating layer 10 have different object colors, so the parts including the fastening hole 4, the lid portion 5, and the other seal portion 6 can be more easily distinguished. By clearly distinguishing between the parts of the gasket 1 in this manner, it becomes easier to determine an orientation of the gasket 1, such as the front and back. Therefore, it is advantageous to prevent mistakes when combining the metal plate portion 2 or when installing the gasket 1 into an engine or the like.

Thicknesses of respective layers of coating layers 10 may all be the same, but they can also be different. For example, by making the rubber layer 12 thicker than the other layers, durability can be improved. The thickness of respective layers of the coating layer 10 may be, for example, 5 µm to 15 µm.

As described above, according to the present embodiment, the feature of the coating layer 10 can be varied depending on the part of the gasket 1 by multilayering the coating layer for each feature. In other words, the rubber layer 12 is arranged at a portion where the micro-sealing property is required, and the lubricating layer 13 is laminated on the rubber layer 12 at a portion where the slidability is required in addition to the micro-sealing property. Therefore, even when the sealing target hole 3 and the fastening hole 4 are formed in the metal plate, the micro-sealing property and the slidability can be secured.

For example, in a single-layered coating layer of the related art, rubber, solid lubricant, and binder are mixed, so that only one application process is required, but a ratio of each per unit area is low. In other words, in the single-layered coating layer, the features of the rubber, the solid lubricant, and the binder are exhibited, but the respective features are low. On the other hand, according to the present embodiment, the coating layer 10 is multi-layered for each feature, so that the processes and labor for forming each layer increase, but the feature of each layer does not deteriorate. In addition, in the c single-layered coating layer of the related art, a large number of components are mixed, resulting in non-uniform features depending on the part and a low yield. On the other hand, according to the present embodiment, since the coating layer 10 is multi-layered for each feature, non-uniformity in feature between parts is less likely to occur, and thus a high yield can be maintained.

Although the embodiment of the present disclosure is described above, the gasket of the present disclosure is not limited to a specific embodiment, and various modifications and changes are possible within the scope of the present disclosure.

The gasket of the present disclosure is applicable to various known gaskets without being limited to a cylinder head gasket. For example, it can be applied to an exhaust gasket used for connecting exhaust pipes and a manifold gasket.

In the gasket of the present disclosure, the features of the coating layer 10 differ depending on the parts, but when the parts overlap each other, disadvantage of the coating layer should be prioritized. For example, when the periphery of the sealing target hole 3 and the periphery of the fastening hole 4 overlap, it is preferable to apply a coating layer 10 of two layers (adhesion layer 11 and rubber layer 12) instead of three layers to the overlapped parts.

What is claimed is:

1. A gasket comprising:
   a metal plate portion having a sealing target hole and a fastening hole; and
   a coating layer applied to a surface of the metal plate portion,
   wherein the coating layer includes a rubber layer and a lubricating layer having a lower coefficient of friction than the surface of the metal plate portion, and wherein in the coating layer on a part of the surface of the metal plate portion that includes at least a periphery of the sealing target hole, the rubber layer and the lubricating layer are laminated and the lubricating layer is arranged as an outer surface of the coating layer, the outer surface of the coating layer being opposite an inner surface of the coating layer facing the surface of the metal plate portion, and wherein in the coating layer on a part of the surface of the metal plate portion that includes a periphery of the fastening hole, the rubber layer is laminated and the lubricating layer is omitted so that the rubber layer is arranged as the outer surface of the coating layer.

2. The gasket according to claim 1, wherein a lid portion that is constantly exposed to liquid is partitioned on the surface of the metal plate portion, and wherein the coating layer is omitted from the lid portion and the surface of the metal plate portion is exposed at the lid portion.

3. The gasket according to claim 1, wherein the coating layer further includes an adhesion layer, and wherein the adhesion layer is interposed between the surface of the metal plate portion and the rubber layer.

4. The gasket according to claim 3, wherein the coating layer on a part of the surface of the metal plate portion excluding the periphery of the fastening hole and the lid portion is formed of three layers, the adhesion layer, the rubber layer, and the lubricating layer, which are laminated in this order from the surface of the metal plate portion.

5. The gasket according to claim 1, wherein the metal plate portion includes a tag portion projecting outward from an outer periphery in plan view, and wherein each of the coating layers is exposed on a surface of the tag portion.

6. The gasket according to claim 1, wherein an object color of the metal plate portion and object colors of each of all layers included in the coating layer are set to be different with one another so as to allow management by color.

* * * * *